(12) United States Patent
Shibuya et al.

(10) Patent No.: US 11,500,140 B2
(45) Date of Patent: Nov. 15, 2022

(54) POLARIZING PLATE AND OPTICAL APPARATUS HAVING TIP PORTIONS WITH CONTINUOUS CURVED SURFACE

(71) Applicant: DEXERIALS CORPORATION, Tokyo (JP)

(72) Inventors: Kazuyuki Shibuya, Tokyo (JP); Shigeshi Sakakibara, Tokyo (JP); Toshiaki Sugawara, Tokyo (JP); Yusuke Matsuno, Tokyo (JP); Akio Takada, Tokyo (JP)

(73) Assignee: DEXERIALS CORPORATION, Tochigi (JP)

( * ) Notice: Subject to any disclaimer, the term of this patent is extended or adjusted under 35 U.S.C. 154(b) by 0 days.

(21) Appl. No.: 16/755,441

(22) PCT Filed: Jul. 25, 2019

(86) PCT No.: PCT/JP2019/029223
§ 371 (c)(1),
(2) Date: Apr. 10, 2020

(87) PCT Pub. No.: WO2020/022433
PCT Pub. Date: Jan. 30, 2020

(65) Prior Publication Data
US 2021/0208323 A1   Jul. 8, 2021

(30) Foreign Application Priority Data

Jul. 26, 2018   (JP) .............................. JP2018-140653

(51) Int. Cl.
*G02B 5/30*   (2006.01)
*G02F 1/1335*   (2006.01)
*G02B 1/118*   (2015.01)

(52) U.S. Cl.
CPC .......... *G02B 5/3033* (2013.01); *G02B 5/3058* (2013.01); *G02B 5/3066* (2013.01);
(Continued)

(58) Field of Classification Search
CPC .......... B82Y 20/00; B82Y 40/00; G02B 1/118; G02B 5/3033; G02B 5/3058; G02B 5/3066; G02F 1/133502; G02F 1/133548
See application file for complete search history.

(56) References Cited

U.S. PATENT DOCUMENTS

| | | | |
|---|---|---|---|
| 9,316,771 B2 * | 4/2016 | Kaida | G02B 5/3025 |
| 2009/0009865 A1 * | 1/2009 | Nishida | G02B 5/3058 |
| | | | 427/163.1 |

(Continued)

FOREIGN PATENT DOCUMENTS

| | | |
|---|---|---|
| CN | 105093380 A | 11/2015 |
| CN | 105158836 A | 12/2015 |

(Continued)

OTHER PUBLICATIONS

"Chinese Application Serial No. 201980003239.5, Office Action dated May 20, 2021", w/English Translation, (dated May 20, 2021), 13 pgs.

(Continued)

*Primary Examiner* — Ryan S Dunning
(74) *Attorney, Agent, or Firm* — Schwegman Lundberg & Woessner, P.A.

(57) ABSTRACT

A polarizing plate includes a substrate and a plurality of projections which protrude with respect to the substrate, in which the plurality of projections are formed by periodically arraying projections extending in a first direction in plan view, each of the projections includes a reflective layer and a tip end portion, the tip end portion is arranged at a position further away from the substrate than the reflective layer, the (Continued)

tip end portion is continuously widened from a first end portion, which is a tip end, to a second end portion on a side close to the substrate in a first cut plane perpendicular to the substrate and the first direction, and a first surface of the tip end portion includes a continuous first curved surface.

8 Claims, 10 Drawing Sheets

(52) U.S. Cl.
CPC ........ *G02F 1/133548* (2021.01); *G02B 1/118* (2013.01); *G02F 1/133502* (2013.01)

(56) References Cited

U.S. PATENT DOCUMENTS

| | | |
|---|---|---|
| 2015/0060396 A1 | 3/2015 | Kaida et al. |
| 2017/0242172 A1 | 8/2017 | Kerzabi et al. |
| 2018/0081103 A1 | 3/2018 | Takeda |
| 2018/0180786 A1* | 6/2018 | Takeda ................. G02B 5/3058 |

FOREIGN PATENT DOCUMENTS

| | | |
|---|---|---|
| CN | 107121719 A | 9/2017 |
| JP | 2008107392 A | 5/2008 |
| JP | 2010145854 A | 7/2010 |
| JP | 2010237437 A | 10/2010 |
| JP | 2013130598 A | 7/2013 |
| JP | 5476142 B2 | 2/2014 |
| JP | 2015046459 A | 3/2015 |
| JP | 5796522 B2 | 8/2015 |
| JP | 2016212156 A | 12/2016 |
| JP | 6302040 B1 | 3/2018 |

OTHER PUBLICATIONS

"International Application No. PCT/JP2019/029223, International Search Report dated Sep. 24, 2019", w/ English Translation, (dated Sep. 24, 2019), 2 pgs.

* cited by examiner

POLARIZING PLATE AND OPTICAL APPARATUS HAVING TIP PORTIONS WITH CONTINUOUS CURVED SURFACE

PRIORITY APPLICATIONS

This application is a U.S. National Stage Filing under 35 U.S.C. 371 from International Application No. PCT/JP2019/029223, filed on Jul. 25, 2019, and published as WO2020/022433 on Jan. 30, 2020, which claims the benefit of priority to Japanese Application No. 2018-140653, filed on Jul. 26, 2018; the benefit of priority of each of which is hereby claimed herein, and which applications and publication are hereby incorporated herein by reference in their entirety.

TECHNICAL FIELD

The present invention relates to a polarizing plate and an optical apparatus.

Priority is claimed on Japanese Patent Application No. 2018-140653, filed on Jul. 26, 2018, the content of which is incorporated herein by reference.

BACKGROUND ART

Polarizing plates are used in liquid crystal displays and the like. In recent years, attention has been focused on wire grid polarizing plates in which reflective layers are arranged with a period shorter than the wavelength of light in the used light region.

For example, Patent Document 1 discloses a wire grid polarizing plate in which thin metal wires having a rectangular cross section are arranged. Patent Document 2 discloses a wire grid polarizing plate having a thin metal wire having a trapezoidal cross section. Patent Document 3 discloses a wire grid polarizing plate in which the cross-sectional shape of a thin metal wire is an inwardly warped shape.

The wire grid polarizing plates described in Patent Documents 1 to 3 are reflection type wire grid polarizing plates. In contrast, an absorption type wire grid polarizing plate is proposed. The reflection type wire grid polarizing plate transmits light of a specific deflection component and reflects light of other deflection components.

In contrast, the absorption type wire grid polarizing plate transmits light of a specific deflection component and cancels light of other deflection components by interference.

The wire grid polarizing plate described in Patent Document 4 is an absorption type wire grid polarizing plate having a dielectric layer and an absorption layer on one surface of a reflective layer. The reflected light is canceled by causing the light reflected at the reflective layer and the light reflected at the absorption layer to interfere with each other. Patent Document 4 describes the shape of a grid tip end portion including a reflective layer, a dielectric layer and an absorption layer such that transmittance characteristics and reflectance characteristics are improved.

CITATION LIST

Patent Literature

[Patent Document 1] Japanese Unexamined Patent Application, First Publication No. 2010-237437
[Patent Document 2] Japanese Patent No. 5796522
[Patent Document 3] Japanese Patent No. 5476142
[Patent Document 4] Japanese Patent No. 6302040

DISCLOSURE OF INVENTION

Technical Problem

When a polarizing plate having high reflectance is used in a liquid crystal projector and the like, the use of the polarizing plate may cause malfunction of the liquid crystal panel and deterioration of image quality due to stray light. With an increase in brightness and definition of a liquid crystal projector and the like in recent years, a further reduction in reflectance has been required in polarizing plates.

The present invention has been made in consideration of the above problems and an object thereof is to provide a polarizing plate and an optical apparatus having excellent optical characteristics.

Solution to Problem

In order to solve the above problems, the present invention provides the following means.

A polarizing plate according to a first aspect is a polarizing plate having a wire grid structure, and includes a transparent substrate, and a plurality of projections which extend in a first direction on the transparent substrate and are periodically arrayed at a pitch that is shorter than a wavelength of light in a used light region, in which each of the projections includes a reflective layer, and a tip end portion, the tip end portion is arranged at a position further away from the substrate than the reflective layer, the tip end portion is continuously widened from a first end portion, which is a tip end, to a second end portion on a side close to the substrate in a first cut plane perpendicular to the substrate and the first direction, and a first surface of the tip end portion includes a continuous first curved surface.

In the first cut plane of the polarizing plate according to the aspect, a step may be provided at a connection portion between the tip end portion and the reflective layer.

In the first cut plane of the polarizing plate according to the aspect, when the maximum width of the reflective layer is $D_R$, and the maximum width of the tip end portion is $D_T$, a relationship of $1 \leq D_T/D_R \leq 2.3$ may be satisfied.

In the first cut plane of the polarizing plate according to the aspect, the reflective layer may include a second curved surface recessed toward a central axis of the reflective layer.

In the polarizing plate according to the aspect, part of the second curved surface may be in contact with a first end portion of the reflective layer on a side close to the tip end portion.

In the first cut plane of the polarizing plate according to the aspect, when the height of the reflective layer is $H_R$, and the height of the second curved surface is $H_C$, a relationship of $0.3 \leq H_C/H_R \leq 1$ may be satisfied.

In the polarizing plate according to the aspect, in a case where the center of the second end portion of the tip end portion is used as an origin, a first curved surface of the tip end portion may be approximated by the following relational expression (1).

$$z = (-D_T^2/4H_T)x^2 + H_T \quad (1)$$

In the relational expression (1), $D_T$ represents the maximum width of the tip end portion and $H_T$ represents the height of the tip end portion.

In the polarizing plate according to the aspect, in a case where a middle point of a position where a width of the reflective layer is minimum is used as an origin, a second curved surface of the reflective layer may be approximated by the following relational expression (2).

$$z^2 = ((-H_C^2 + 2D_C)/4D_R^2)x^2 + (D_C/2) \quad (2)$$

In the relational expression (2), $H_C$ represents the height of the second curved surface, $D_C$ represents the minimum width of the reflective layer, and $D_R$ represents the maximum width of the reflective layer.

An optical apparatus according to a second aspect includes the polarizing plate according to the above aspect.

Advantageous Effects of Invention

According to the polarizing plate and the optical apparatus of the aspects, it is possible to improve optical characteristics.

BEST MODE FOR CARRYING OUT THE INVENTION

Figure 1:
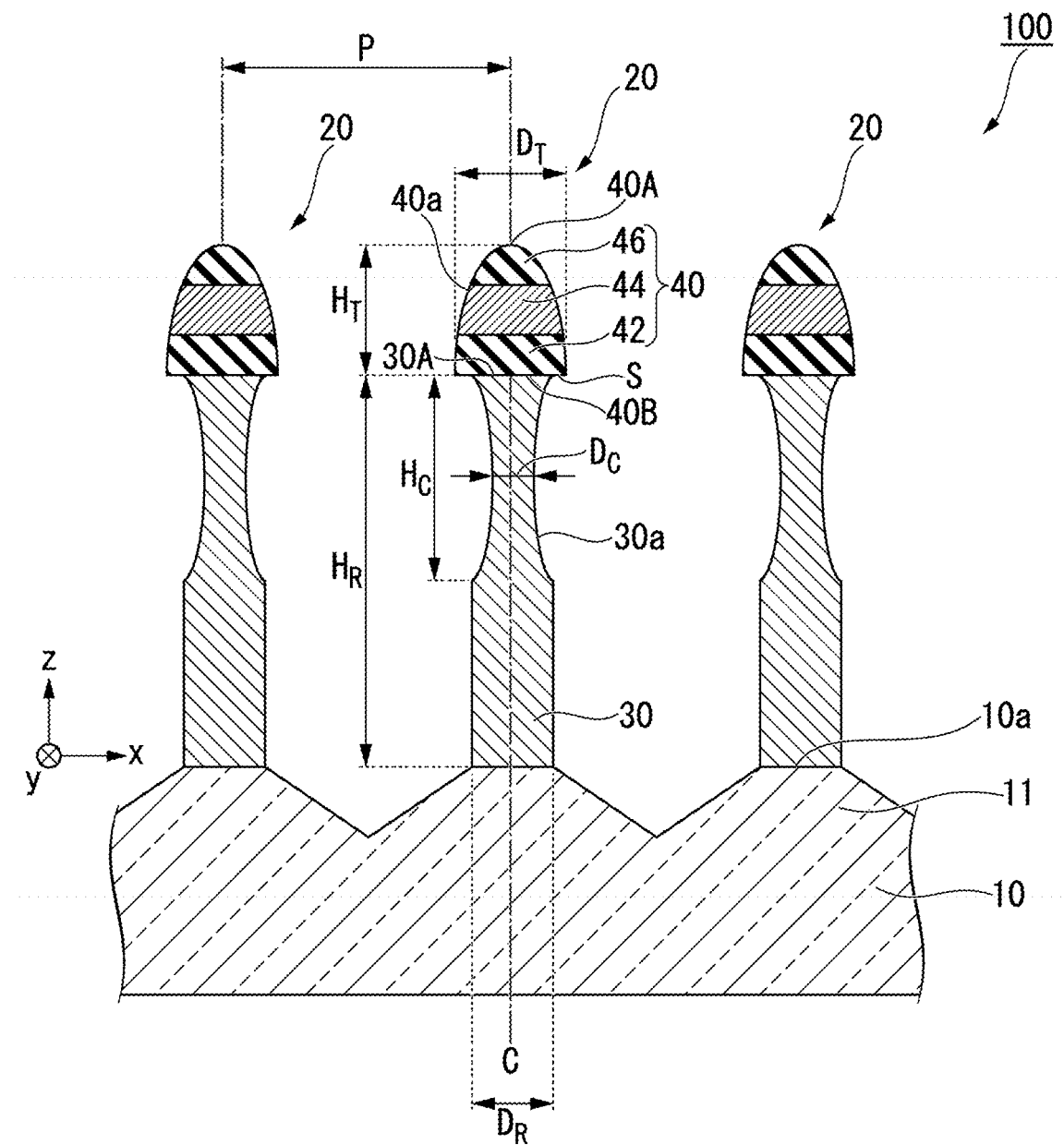
FIG. 1 is a schematic cross-sectional view of a polarizing plate according to a first embodiment.

Hereinafter, embodiments will be described in detail with reference to the drawings. In the drawings in the following description, parts may be enlarged for easy understanding, and the dimensional ratio of each component may be different from the actual ones. The materials, dimensions, and the like illustrated in the following description are merely examples, and the present invention is not limited thereto and can be implemented with appropriate modifications within a range in which the effects of the present invention can be obtained.

[Polarizing Plate]

FIG. 1 is a schematic cross-sectional view of a polarizing plate 100 according to a first embodiment. The polarizing plate 100 is a polarizing plate having a wire grid structure. The polarizing plate 100 includes a substrate 10, and a plurality of projections 20. The plurality of projections 20 extend in a first direction in plan view. Hereinafter, a plane in which the substrate 10 extends is defined as an xy plane and the first direction in which the plurality of projections 20 extend is defined as a y-direction. In addition, a direction orthogonal to the xy plane is defined as a z-direction. FIG. 1 is a cross-sectional view of the polarizing plate 100 cut along the xz plane. In other words, FIG. 1 is a cross-sectional view perpendicular to the first direction in which the plurality of projections 20 extend.

The polarizing plate 100 attenuates a polarized wave (TE wave (S wave)) having an electric field component parallel to the y-direction in which the projection 20 extends and transmits a polarized wave (TM wave (P wave)) having an electric field component perpendicular to the y-direction.

The polarizing plate 100 has an absorption axis in the y-direction and a transmission axis in the x-direction.

(Substrate)

The substrate 10 has transparency with respect to light having a wavelength in a used light region of the polarizing plate 100. Regarding the expression "has transparency", the substrate does not necessarily allow transmission of 100% of the light having a wavelength in the used light region, but may allow transmission of light to such an extent that the function as a polarizing plate can be maintained. The average thickness of the substrate 10 is preferably 0.3 mm or more and 1 mm or less.

The substrate 10 is preferably formed from a material having a refractive index of 1.1 to 2.2. For example, glass, quartz, sapphire, or the like can be used. The component composition of the glass material used for the substrate 10 is not particularly limited.

For example, silicate glass is widely distributed as optical glass and is inexpensive. In addition, quartz glass (refractive index: 1.46) and soda lime glass (refractive index: 1.51) are inexpensive and excellent in transparency. In contrast, quartz and sapphire have excellent thermal conductivity. The material of the substrate 10 can be appropriately selected according to the performance required for the polarizing plate 100. For example, a polarizing plate for an optical engine of a projector is required to have light resistance and heat dissipation since the polarizing plate is irradiated with strong light. Therefore, it is preferable to use quartz or sapphire for the substrate 10.

The shape of a first surface 10a of the substrate 10 is not limited to a flat surface. For example, the substrate 10 may have a trapezoidal base 11 on the first surface 10a side in the xz cut plane. Due to the base 11, the shape of the first surface 10a becomes uneven.

The base 11 extends in the y-direction. The base 11 moderates a change in refractive index at the refractive index interface between the substrate 10 and the air to suppress the reflection. The height of the base 11 is preferably 10 nm or more and 100 nm or less. The width of the base 11 is preferably wider than the width of a reflective layer 30, which will be described later, of the projection 20. Here, the width of the base 11 is the width of the trapezoidal top observed in the xz cut plane. The base 11 may be formed from the same material as that of the substrate 10 or may be formed from a different material from the substrate.

(Projection)

The projections 20 extend in the y-direction. The projections 20 are periodically arrayed in the x-direction. In other words, the plurality of projections 20 are periodically arrayed in a direction perpendicular to the first direction in which the projections 20 extend. A pitch P of adjacent projections 20 in the x-direction is shorter than the light of the wavelength in the used light region of the polarizing plate 100. For example, the pitch P is preferably 100 nm or more and 200 nm or less. By ensuring that the pitch P falls within this range, the preparation of the projections 20 becomes easy and the mechanical stability and stability of optical characteristics of the projections 20 are increased.

The pitch P of adjacent projections 20 can be measured as an average value with a scanning electron microscope or a transmission electron microscope. For example, a distance between the adjacent projections 20 in the x-direction is measured at four random points, and the pitch P is obtained by the arithmetic mean. A measurement method for averaging the measured values at four random points of the plurality of projections 20 is referred to as an electron microscope method.

Here, the distance between the upper end portions of the adjacent projections 20 or the distance between the centers in the x-direction when the adjacent projections 20 are viewed in plan on the xy plane is referred to as the pitch P.

Hereinafter, the measurement method for averaging the measured values at four random points by using an image observed by a scanning electron microscope or a transmission electron microscope is referred to as an electron microscope method.

The projections 20 protrude with respect to the substrate 10. A main direction in which the projections 20 protrude is the z-direction. The average width of the projections 20 in the x-direction is preferably 20% or more and 50% or less of the pitch P. Here, the average width of the projections 20 means the average value of width at each point obtained by dividing projections 20 into 10 parts in the z-direction. The height of the projections 20 is preferably 250 nm or more and 400 nm or less. In addition, the aspect ratio obtained by dividing the height of the projections 20 by the average width is preferably 5 or more and 13.3 or less.

In a case where the substrate 10 is formed from an optically active crystal such as rock crystal, it is preferable that a direction parallel to or perpendicular to the optical axis of the crystal and a direction in which the projections 20 extend coincide with each other. Here, the optical axis is the axis in the direction in which a difference between the refractive index of an ordinary ray (O) of light and the refractive index of an extraordinary ray (E) of light travelling along the direction is minimum. By making the projections 20 extend in the direction, the optical characteristics can be improved.

The projection 20 respectively has a reflective layer 30 and a tip end portion 40. In the projection 20 shown in FIG. 1, the reflective layer 30 and the tip end portion 40 are laminated in this order from the substrate 10 side.

<Tip End Portion>

The tip end portion 40 is arranged at a position further away from the substrate 10 than the reflective layer 30. The tip end portion 40 has a tip end (first end portion 40A) on the outer surface side far from substrate 10. As shown in FIG. 1, the tip end portion 40 is continuously widened from the first end portion 40A to a second end portion 40B in a first cut plane cut in the xz plane. The second end portion 40B is an end portion of the tip end portion 40 on the substrate 10 side.

Here, the expression "continuously widened" means the width of the tip end portion in the x-direction is not narrowed from the first end portion 40A to the second end portion 40B. That is, the expression "continuously widened" includes a case where the width of the tip end portion in the x-direction is gradually increased from the first end portion 40A to the second end portion 40B, and a case where the width of the tip end portion in the x-direction expands to a middle portion from the first end portion 40A to the second end portion 40B, and then becomes constant. For example, in a case where the cut width does not include a portion that becomes narrower from the first end portion 40A to the second end portion 40B when the tip end portion 40 is divided into 10 parts in the z-direction, it can be considered that the tip end portion 40 is continuously widened.

It is preferable that the change rate of the tip end portion 40 in the x-direction on the xz plane be larger on the first end portion 40A side than on the second end portion 40B side.

A first surface 40a of the tip end portion 40 includes a first curved surface. The first surface 40a of the tip end portion 40 in FIG. 1 forms the first curved surface. Since the first surface 40a of the tip end portion 40 includes the first curved surface, the transmission axis reflectance of the polarizing plate 100 can be reduced. The first curved surface of the first surface 40a is preferably a curved surface projecting in a +z direction. The +z direction is a direction from the second end portion 40B to the first end portion 40A, and a −z direction is a direction from the first end portion 40A to the second end portion 40B.

Figure 2:
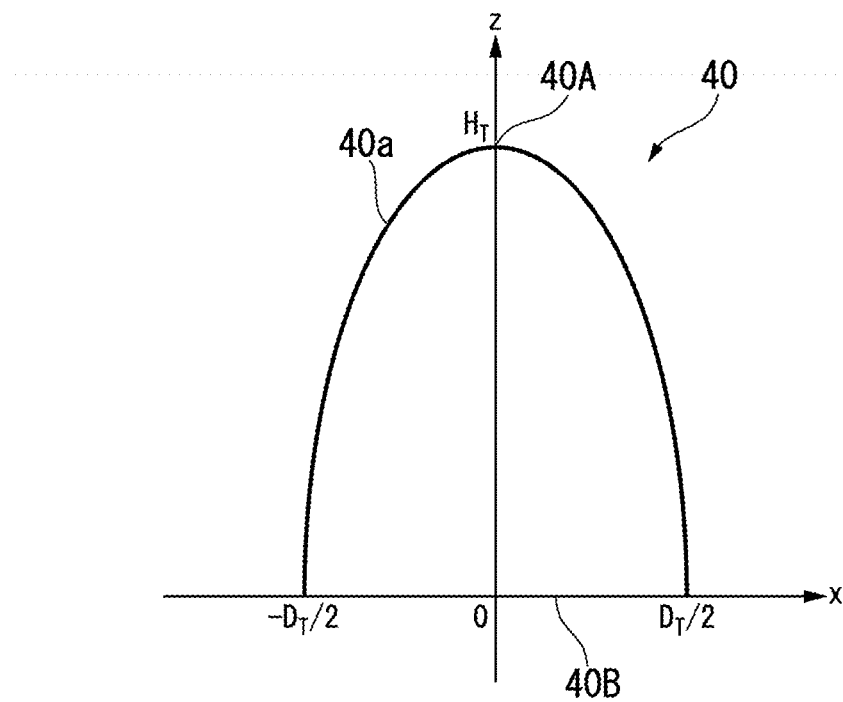
FIG. 2 is a view in which a first surface of a tip end portion is projected on an xz plane.

FIG. 2 is a view in which the first surface 40a of the tip end portion 40 is projected on the xz plane. In FIG. 2, the center of the second end portion 40B of the tip end portion 40 is used as the origin. As shown in FIG. 2, as an example, the first surface 40a can be approximated by the following relational expression (1).

$$z = (-D_T^2/4H_T)x^2 + H_T \quad (1)$$

In the relational expression (1), $D_T$ represents the maximum width of the tip end portion 40, and $H_T$ represents the height of the tip end portion 40. The tip end portion 40 is widened from the first end portion 40A to the second end portion 40B, and thus the width of the second end portion 40B corresponds to the maximum width. When the shape of the first surface 40a of the tip end portion 40 can be approximated by the following relational expression (1), the optical characteristics of the polarizing plate 100 are improved.

The maximum width $D_T$ of the tip end portion 40 and the height $H_T$ of the tip end portion 40 can be measured using the electron microscope method as described above. The maximum width $D_T$ of the tip end portion 40 is preferably 20% or more and 50% or less of the pitch P.

The tip end portion 40 shown in FIG. 1 has a dielectric layer 42, an absorption layer 44, and a second dielectric layer 46 from the substrate 10 side. The dielectric layer 42, the absorption layer 44, and the second dielectric layer 46 attenuate the polarized wave (TE wave (S wave)) reflected at the reflective layer 30 by interference.

[Dielectric Layer]

The dielectric layer 42 shown in FIG. 1 is laminated on the reflective layer 30. The dielectric layer 42 does not necessarily need to be in contact with the reflective layer 30 and another layer may exist between the dielectric layer 42 and the reflective layer 30. The dielectric layer 42 extends in a strip shape in the y-direction. The dielectric layer 42 forms part of the tip end portion 40.

The film thickness of the dielectric layer 42 can be determined according to the polarized wave reflected at the absorption layer 44. The film thickness of the dielectric layer 42 is determined such that the phase of the polarized wave reflected at the absorption layer 44 and the phase of the polarized wave reflected at the reflective layer 30 are shifted from each other by a half wavelength. Specifically, the film thickness of the dielectric layer 42 is preferably 1 nm or more and 500 nm or less. Within this range, the relationship between the phases of the two reflected polarized waves can be adjusted and the interference effect can be enhanced. The film thickness of the dielectric layer 42 can be measured using the electron microscope method described above.

For the dielectric layer 42, metal oxides, magnesium fluorides ($MgF_2$), cryolite, germanium, silicon, boron nitride, carbon, or combinations of these materials can be used. Examples of the metal oxides include Si oxides such as $SiO_2$, $Al_2O_3$, beryllium oxide, bismuth oxide, boron oxide, and tantalum oxide. Among these, the dielectric layer 42 is preferably formed from Si oxide.

The refractive index of the dielectric layer 42 is preferably more than 1.0 and 2.5 or less. The optical characteristics of the reflective layer 30 are affected by the surrounding refractive index (for example, the refractive index of the dielectric layer 42). By adjusting the refractive index of the dielectric layer 42, the polarization characteristics can be controlled.

[Absorption Layer]

The absorption layer 44 shown in FIG. 1 is laminated on the dielectric layer 42. The absorption layer 44 extends in a strip shape in the y-direction. The absorption layer 44 forms part of the tip end portion 40.

For example, the film thickness of the absorption layer 44 is preferably 10 nm or more and 100 nm or less. The film thickness of the absorption layer 44 can be measured using the electron microscope method described above.

For the absorption layer 44, one or more kinds of substances having a light absorption action in which the extinction constant of the optical constant is not zero can be used. For the absorption layer 44, a metal material or a semiconductor material can be used. The material used for the absorption layer 44 can be appropriately selected depending on the wavelength range of light in the used light region.

In a case where a metal material is used for the absorption layer 44, the metal material is preferably an elemental simple metal such as Ta, Al, Ag, Cu, Au, Mo, Cr, Ti, W, Ni, Fe, or Sn, or an alloy containing one or more of these elements. In addition, in a case where a semiconductor material is used for the absorption layer 44, the semiconductor material is preferably Si, Ge, Te, ZnO, or a silicide material. Examples of the silicide material include β-$FeSi_2$, $MgSi_2$, $NiSi_2$, $BaSi_2$, $CrSi_2$, and $TaSi$. The polarizing plate 100 having the absorption layer 44 formed using these materials has a high extinction ratio in the visible wavelength region. In addition, it is particularly preferable that the absorption layer 44 include Fe or Ta and Si.

In a case where the absorption layer 44 is formed from the semiconductor material, the band gap energy of the semiconductor contributes to the light absorption action. Therefore, the band gap energy of the semiconductor material is set to be equal to or less than a value obtained by converting the wavelength of the used light region into energy. For example, in a case where the used light region is the visible light region, a semiconductor material having a band gap of 3.1 eV or less, which corresponds to the light absorption energy at a wavelength of 400 nm or more, is preferably used.

The absorption layer 44 is not limited to one layer and may be composed of two or more layers. In a case where the absorption layer 44 is composed of two or more layers, the respective layers may be formed from mutually different materials. The absorption layer 44 can be formed by methods of vapor deposition, sputtering methods, and the like.

[Second Dielectric Layer]

The second dielectric layer 46 shown in FIG. 1 is laminated on the absorption layer 44. The second dielectric layer 46 extends in a strip shape in the y-direction. The second dielectric layer 46 forms part of the tip end portion 40.

For the second dielectric layer 46, the same material as that of the dielectric layer 42 described above can be used. The second dielectric layer 46 may be formed from the same material as the material of the dielectric layer 42 or may be formed from a material different from the material of the dielectric layer 42.

The second dielectric layer 46 is preferably formed from Si oxide. The refractive index of the second dielectric layer 46 preferably has the same range as the refractive index of the dielectric layer 42 described above. For example, the thickness of the second dielectric layer 46 is preferably 10 nm or more and 100 nm or less. The thickness of the second dielectric layer 46 can be measured using the electron microscope method as described above.

<Reflective Layer>

The reflective layer 30 is located between the substrate 10 and the tip end portion 40. Another layer may be inserted between the substrate 10 and the reflective layer 30. The reflective layer 30 protrudes in the z direction with respect to the substrate 10 and extends in a strip shape in the y-direction. The reflective layer 30 reflects a TE wave (S wave) and transmits a TM wave (P wave).

As shown in FIG. 1, the reflective layer 30 preferably has a second curved surface 30a that is recessed with respect to a central axis C of the reflective layer 30 in the x-direction. The second curved surface 30a is preferably a curved surface that projects or is recessed in the x-direction. The central axis C in the x-direction is arranged along the center of the width of the reflective layer 30 in the x-direction. That is, in other words, curved surfaces are formed on the second curved surface 30a such that both side surfaces of the reflective layer 30 are recessed toward the central axis C of the reflective layer 30.

It is preferable that the portion of the second curved surface 30a closest to the central axis C (the position where the width of the reflective layer 30 is minimum) be located closer to the tip end portion 40 side than the center position of the reflective layer 30 in the z-direction. That is, the second curved surface 30a is preferably located on the tip end portion 40 side of the reflective layer 30.

It is preferable that part of the second curved surface 30a be in contact with a first end portion 30A on the tip end portion 40 side of the reflective layer 30. Since the second curved surface 30a is in contact with the first end portion 30A of the reflective layer 30, the transmission axis transmittance of the polarizing plate 100 can be improved.

That is, the reflective layer 30 having the second curved surface 30a may be configured such that the upper end portion of the second curved surface 30a becomes the first end portion 30A of the reflective layer 30.

Figure 3:
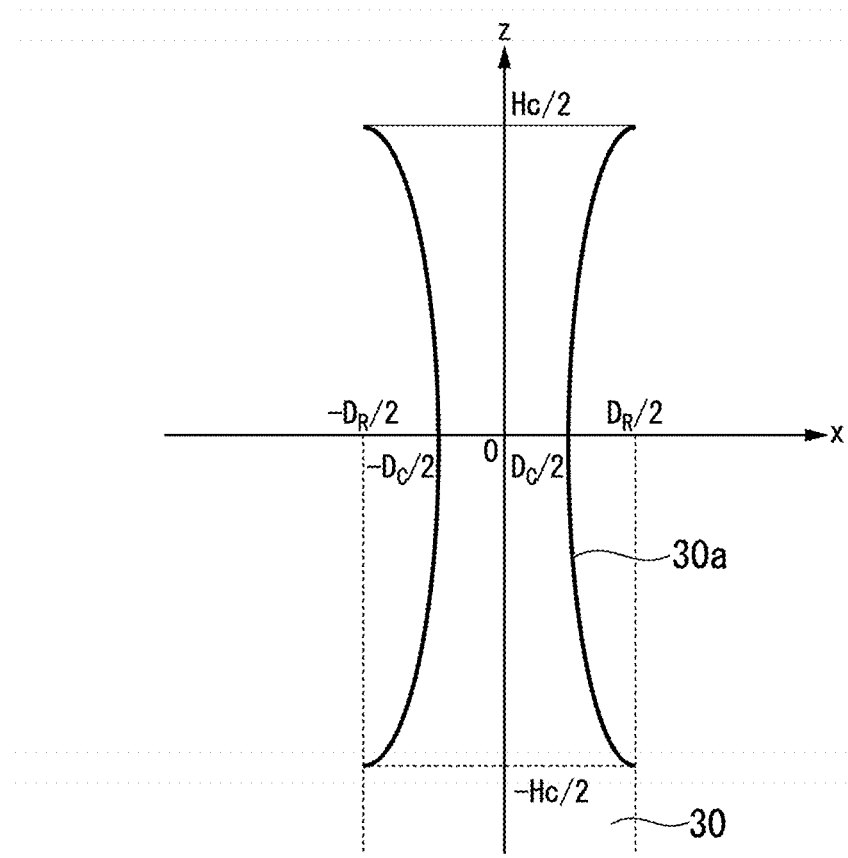
FIG. 3 is a view in which a second curved surface of a reflective layer is projected on the xz plane.

FIG. 3 is a view in which the second curved surface 30a of the reflective layer 30 is projected on the xz plane. In FIG. 3, the middle point the position where the width of the reflective layer 30 is minimum is used as the origin. As shown in FIG. 3, as an example, the second curved surface 30a can be approximated by the following relational expression (2).

$$z^2 = ((-H_C^2 + 2D_C)/4D_R^2)x^2 + (D_C/2) \quad (2)$$

In the relational expression (2), $H_C$ represents the height of the second curved surface 30a, $D_C$ represents the minimum width of the reflective layer 30, and $D_R$ represents the maximum width of the reflective layer 30. Here, the height of the second curved surface 30a means the width of the second curved surface 30a in the z-direction.

When the height of the reflective layer 30 is $H_R$ and the height of the second curved surface 30a is $H_C$, a relationship of $0.3 \leq H_C/H_R \leq 1$ is preferably satisfied, and a relationship of $0.4 \leq H_C/H_R \leq 0.6$ is more preferably satisfied. When the height $H_C$ of the second curved surface 30a with respect to the entire height $H_R$ reflective layer 30 falls within the above range, the transmission axis transmittance of the polarizing plate 100 is increased.

The maximum width $D_R$, the minimum width $D_C$ and the height $H_R$ of the reflective layer 30, and the height $H_C$ of the second curved surface 30a can be measured using the electron microscope method described above. The maximum width $D_R$ of the reflective layer 30 is preferably 20% or more and 50% or less of the pitch P. For example, the height of the reflective layer 30 is preferably 100 nm or more and 300 nm or less.

In addition, it is preferable that the reflective layer 30 satisfy the following relationship with the tip end portion 40. It is preferable that a step S be provided in a connection portion between the tip end portion 40 and the reflective layer 30. When the width of the tip end portion 40 is wider than the width of the reflective layer 30, the transmission performance of the polarizing plate 100 is improved. Here, the width of the tip end portion 40 is the width of the second end portion 40B to be connected with the reflective layer 30.

It is preferable that the maximum width $D_R$ of the reflective layer 30 and the maximum width $D_T$ of the tip end portion 40 satisfy a relationship of $1 \leq D_T/D_R \leq 2.3$. When this relationship is satisfied, the absorption axis reflectance of the polarizing plate 100 is decreased.

For the reflective layer 30, a material having reflectance characteristics to light having a wavelength in the used light region can be used. For example, elemental simple metals such as Al, Ag, Cu, Mo, Cr, Ti, Ni, W, Fe, Si, Ge, and Ta, or alloys thereof can be used. Among these, it is preferable to use aluminum or an aluminum alloy. In addition, the material of the reflective layer 30 is not limited to the metal and an inorganic film or a resin film whose surface reflectance is increased by coloring or the like can be used.

Figure 4:
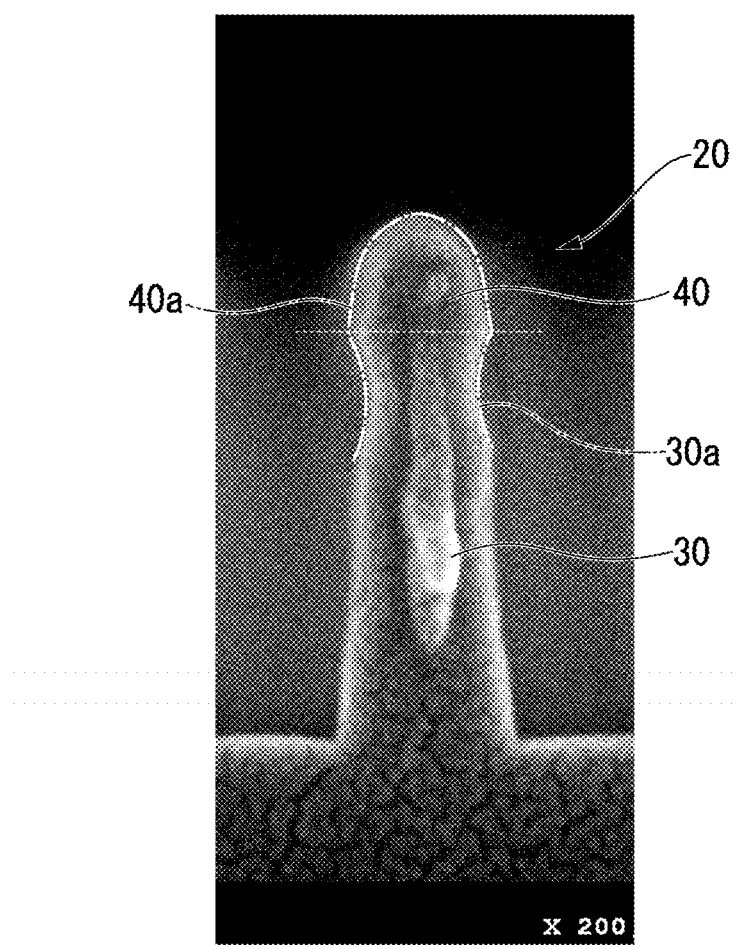
FIG. 4 is an image obtained by photographing a cross section of one projection in a polarizing plate according to a first embodiment with a scanning electron microscope (SEM).

FIG. 4 is an image obtained by photographing a cross section of one projection 20 in the polarizing plate 100 according to the embodiment with a scanning electron microscope (SEM). As shown in FIG. 4, the tip end portion 40 having the first surface 40a forming the first curved surface and the reflective layer 30 having the second curved surface 30a can also be confirmed from the cross-sectional SEM image. Further, as shown in FIG. 4, some unevenness is observed on the outer surface of the projection 20. The equation "can be approximated" in the above relational expressions (1) and (2) means to be able to approximate to a theoretical shape excluding some unevenness that can be determined as an error.

(Other Configurations)

The polarizing plate 100 may have layers other than the above configuration.

For example, a diffusion barrier layer may be provided between the dielectric layer 42 or the second dielectric layer 46 and the absorption layer 44. The diffusion barrier layer prevents light from diffusing in the absorption layer 44. As the diffusion barrier layer, a metal film of Ta, W, Nb, Ti or the like can be used.

In addition, a protective film may be formed on the light incident side of the polarizing plate 100. For example, when light is incident from the +z direction to the −z direction in FIG. 1, a protective film is formed so as to cover the first surface 10a of the substrate 10 and the periphery of the projection 20. The same material as that of the dielectric layer 42 can be used for the protective film. The protective film suppresses the metal film such as the reflective layer 30 from being oxidized more than necessary. The protective film can be formed using CVD (Chemical Vapor Deposition), ALD (Atomic Layer Deposition), or the like.

Further, a water-repellent film may be formed on the light incident side of the polarizing plate 100. For the water-repellent film, for example, a fluorine-based silane compound such as perfluorodecyltriethoxysilane (FDTS) can be used. The water-repellent film can be formed using CVD, ALD, or the like. The water-repellent film increases the moisture resistance of the polarizing plate 100 and improves the reliability.

As described above, the polarizing plate 100 according to the embodiment has low reflectance and high transmittance. Therefore, the polarizing plate can be used for various optical apparatuses.

While preferred embodiments of the invention have been described in detail, the present invention is not limited to these specific embodiments. Various modifications and changes may be made within the scope of the present invention disclosed in the claims.

Figure 5:
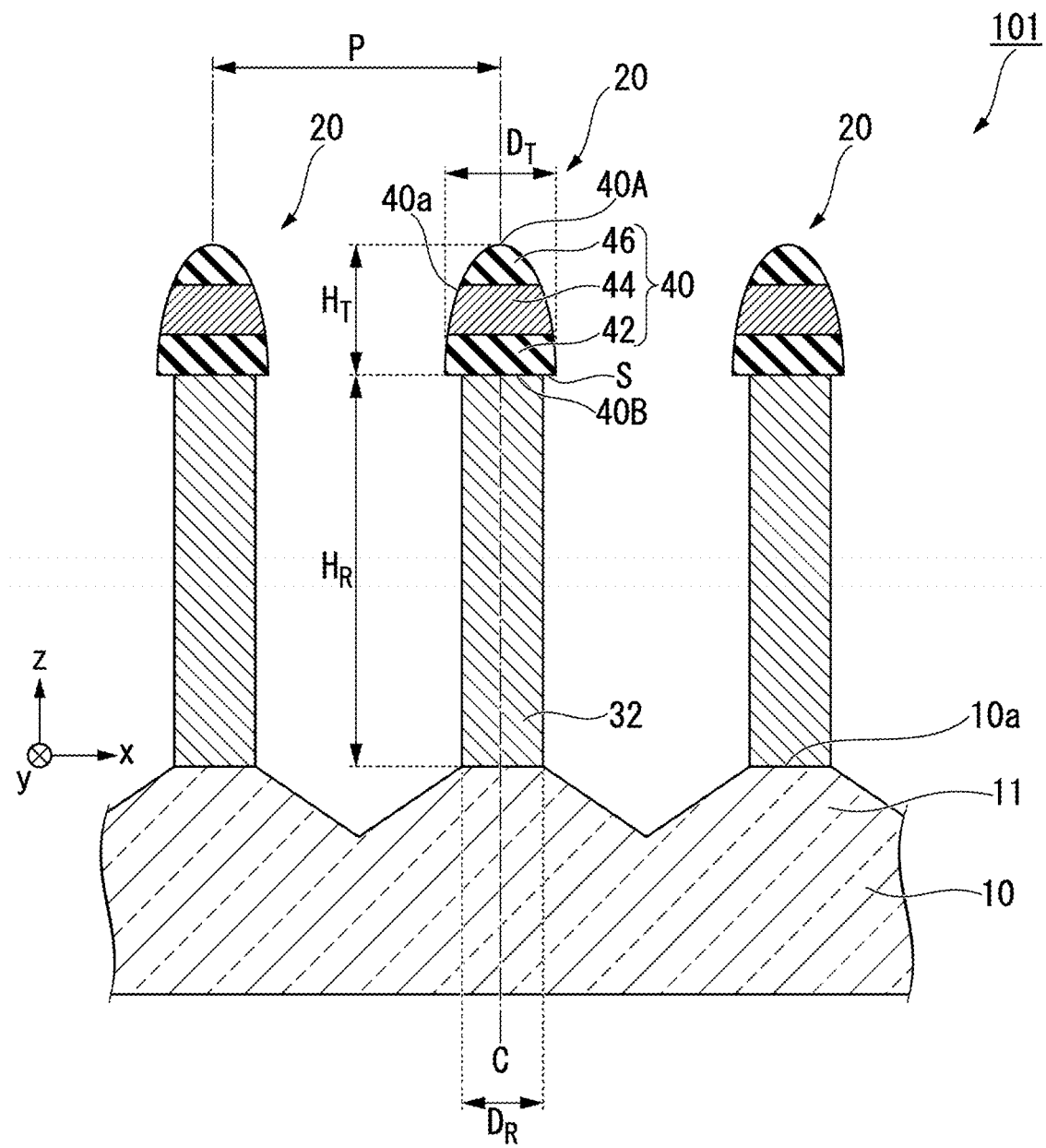
FIG. 5 is a cross-sectional view of another example of the polarizing plate according to the first embodiment.

FIG. 5 is a cross-sectional view of another example of the polarizing plate according to the first embodiment. A polarizing plate 101 shown in FIG. 5 is different from the polarizing plate 100 shown in FIG. 1 in the shape of a reflective layer 32. The reflective layer 32 shown in FIG. 5 does not have a curved surface recessed with respect to the central axis C. On the other hand, the first surface 40a of the tip end portion 40 forms the first curved surface. Therefore, the polarizing plate 101 shown in FIG. 4 also has excellent optical characteristics.

[Method for Manufacturing Polarizing Plate]

A method for manufacturing a polarizing plate includes a substrate preparation step, a film formation step, and an etching step.

In the substrate preparation step, a substrate 10 is prepared. As the substrate 10, a commercially available substrate can be used. In a case of forming a base 11, an underlayer is formed on the substrate 10.

In the film formation step, a layer which becomes a reflective layer, a layer which becomes a dielectric layer, a layer which becomes an absorption layer, and a layer which becomes a second dielectric layer are laminated in order. These layers can be formed using a sputtering method or a vapor deposition method.

In the etching step, each layer formed is etched. The etching is performed through a patterned mask. The mask pattern is formed by a photolithography method, a nanoimprint method, or the like. It is preferable to use dry etching for the etching.

The dielectric layer 42, the absorption layer 44, and the second dielectric layer 46 constituting the tip end portion 40 have different etching rates. By utilizing this difference in etching rate, the shape of the first surface 40a of the tip end portion 40 forms a first curved surface. The etching rate can be adjusted by changing the kind of etching gas, a gas flow rate, a gas pressure, an output voltage for generating ions or radicals, and the like.

In a case where the second curved surface 30a is provided in the reflective layer 30, the partial pressure ratio of the etching gases ($Cl_2$, $BCl$, $N_2$) was changed. In addition, by changing the substrate temperature at the time of etching, the second curved surface 30a may be formed. The etching anisotropy of, for example, Al constituting the reflective layer 30 varies depending on the substrate temperature at the time of etching, the second curved surface 30a is formed in the reflective layer 30.

Further, in a case where the base 11 is formed on the substrate 10, the formed underlayer is etched. The base 11 can be formed by optimizing etching conditions such as a gas flow rate, a gas pressure, an output voltage for generating ions or radicals, and a cooling temperature of the substrate 10.

[Optical Apparatus]

An optical apparatus according to a second embodiment includes the polarizing plate 100 and/or the polarizing plate 101 according to the first embodiment. Examples of optical apparatuses include liquid crystal projectors, head-up displays, and digital cameras and the like. In the polarizing plate 100 and the polarizing plate 101 according to the first embodiment, the transmittance of light polarized in the transmission axis direction is high and the reflectance of light polarized in the absorption axis direction is low. Therefore, the polarizing plates can be used in variety of applications. In addition, the polarizing plate 100 and the polarizing plate 101 are formed from inorganic materials. The polarizing plate 100 and the polarizing plate 101 can be used particularly favorably in liquid crystal projectors and head-up displays and the like which require superior heat resistance to that provided by organic polarizing plates formed from organic materials.

In a case where the optical apparatus includes a plurality of polarizing plates, at least one of the plurality of polarizing plates may be any one of the polarizing plate 100 and the polarizing plate 101 according to the first embodiment. For example, in a case where the optical apparatus is a liquid crystal projector, a polarizing plate is arranged on the incident side and the emission side of the liquid crystal panel. For one of these polarizing plates, the polarizing plate 100 and/or the polarizing plate 101 according to the first embodiment is used.

EXAMPLES

Example 1 and Comparative Examples 1 and 2

In Example 1 and Comparative Examples 1 and 2, changes in the optical characteristics of the polarizing plate when the shape of the tip end portion of the projection was changed were measured. The optical characteristics of the polarizing plate were verified by an electromagnetic field simulation conducted using Rigorous Coupled Wave Analysis (RCWA). The simulation was performed using a grating simulator GSolver V51 manufactured by Grating Solver Development Co.

Example 1

In Example 1, a polarizing plate having the same configuration as the polarizing plate 101 shown in FIG. 5 was prepared. The specific configuration of the polarizing plate of Example 1 will be described based on FIG. 5.

Substrate 10: alkali-free glass (Eagle XG, manufactured by Corning Incorporated)
Height of base 11: 60 nm
Pitch P of adjacent projections 20: 140 nm
Reflective layer 32: aluminum
Maximum width $D_R$ of reflective layer 32: 30 nm
Height $H_R$ of reflective layer 32: 250 nm
Shortest distance between adjacent reflective layers 32: 110 nm
Maximum width $D_T$ of tip end portion 40: 50 nm
Height $H_T$ of tip end portion 40: 60 nm
Configuration of tip end portion 40:
Dielectric layer 42: $SiO_2$, thickness 5 nm
Absorption layer 44: Fe (5 atm %) and Si (95 atm %), thickness 25 nm
Second dielectric layer 46: $SiO_2$, thickness 30 nm
Cross-sectional shape of tip end portion 40 (cross section perpendicular to first direction in which the projection 20 extends): first curved surface projecting upwardly (projecting in +z direction) (the shape of the first curved surface can be approximated by the relational expression (1))

Comparative Example 1

Comparative Example 1 is different from Example 1 only in that the cross-sectional shape of the tip end portion 40 is rectangular. Other conditions were the same as in Example 1.

Comparative Example 2

Comparative Example 2 is different from Example 1 only in that the cross-sectional shape of the tip end portion 40 is triangular. Other conditions were the same as in Example 1.

Figure 6A:
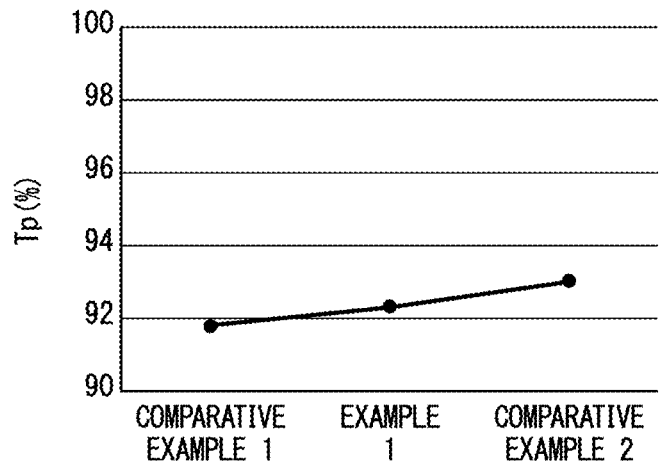
FIG. 6A shows results obtained by measuring the transmission axis transmittance which is one of optical characteristics of each of polarizing plates of Example 1, and Comparative Examples 1 and 2.
Figure 6B:
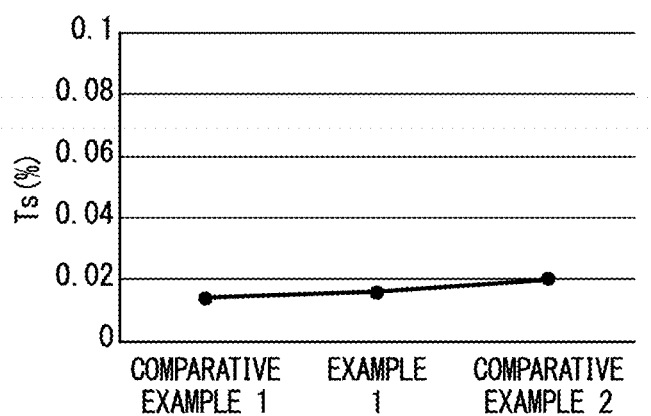
FIG. 6B shows results obtained by measuring the absorption axis transmittance which is one of optical characteristics of each of the polarizing plates of Example 1, and Comparative Examples 1 and 2.
Figure 6C:
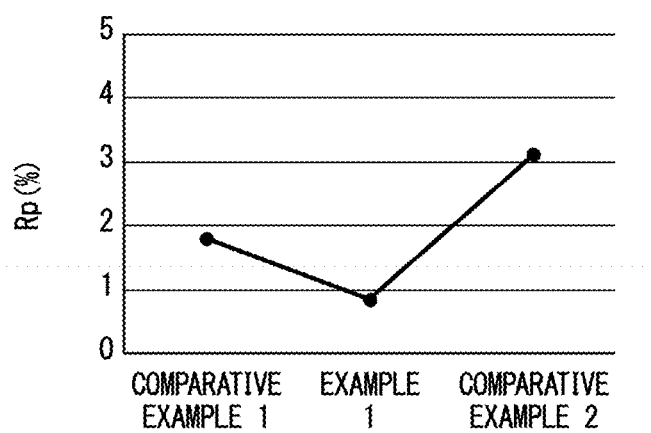
FIG. 6C shows results obtained by measuring the transmission axis reflectance which is one of optical characteristics of each of the polarizing plates of Example 1, and Comparative Examples 1 and 2.

FIGS. 6A to 6C show the results of measuring the optical characteristics of the polarizing plates of Example 1, Comparative Examples 1 and 2.

FIG. 6A shows the result of the transmission axis transmittance Tp, FIG. 6B shows the result of the absorption axis transmittance Ts, and FIG. 6C shows the result of the transmission axis reflectance Rp. In the measurement, the transmittance or the reflectance for light having a wavelength in the G region at a wavelength of 500 nm to 600 nm was obtained. As shown in FIGS. 6A and 6B, the transmission axis transmittance and the absorption axis transmittance did not change significantly even when the shape of the tip end portion was changed. In contrast, as shown in FIG. 6C, the transmission axis reflectance was reduced when the cross-sectional shape of the tip end portion formed the first curved surface.

Example 2

In Example 2, a polarizing plate having the same configuration as the polarizing plate 101 shown in FIG. 5 was prepared. A change in the optical characteristics of the polarizing plate in a case where the relationship between the maximum width $D_T$ of the tip end portion 40 and the maximum width $D_R$ of the reflective layer 32 was changed was measured. The optical characteristics were measured in the same manner as in Example 1. The maximum width $D_R$ of the reflective layer 32 was fixed to 30 nm, and the maximum width $D_T$ of the tip end portion 40 was changed to 10 nm, 20 nm, 30 nm, 50 nm, 70 nm, and 90 nm. The parameters of the tip end portion 40 other than the maximum width $D_T$ were the same as in Example 1.

Figure 7A:
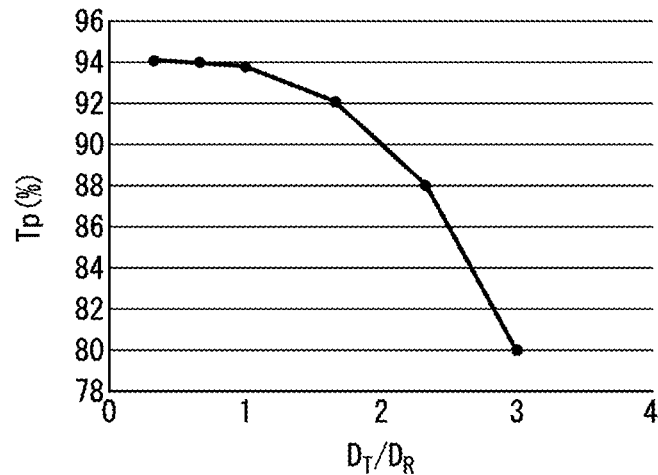
FIG. 7A shows a result obtained by measuring the transmission axis transmittance which is one of optical characteristics of the polarizing plate of Example 2.
Figure 7B:
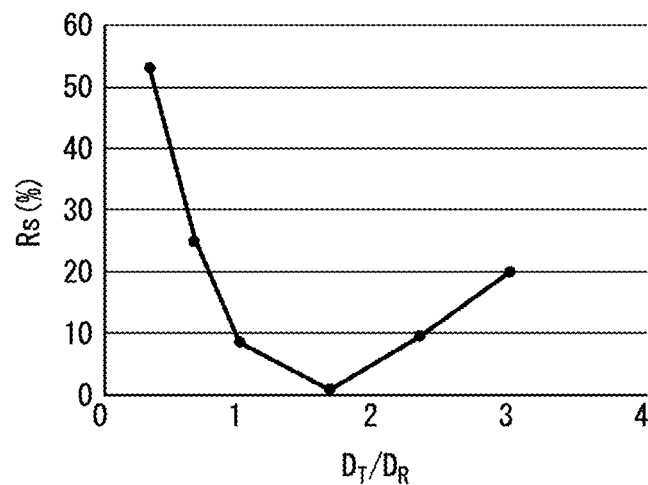
FIG. 7B shows a result obtained by measuring the absorption axis transmittance which is one of optical characteristics of the polarizing plate of Example 2.

FIGS. 7A and 7B show the results of measuring the optical characteristics of the polarizing plate in Example 2. FIG. 7A shows the result of the transmission axis transmittance, and FIG. 7B shows the result of the absorption axis reflectance. In the measurement, the transmittance or the reflectance for light having a wavelength in the G region at a wavelength of 500 nm to 600 nm was obtained. As shown in FIGS. 7A and 7B, when the maximum width $D_R$ of the reflective layer 32 and the maximum width $D_T$ of the tip end portion 40 satisfied a relationship of $1 \leq D_T/D_R \leq 2.3$, the transmission axis transmittance was increased and the absorption axis reflectance was decreased.

Example 3

In Example 3, a polarizing plate having the same configuration as the polarizing plate 100 shown in FIG. 1 was prepared. That is, Example 3 is different from Example 1 in that the reflective layer 30 has the second curved surface 30a. The shape of the second curved surface 30a was a shape projecting downwardly toward the central axis C of the reflective layer 30 and could be approximated by the relational expression (2).

In Example 3, a change in the optical characteristics of the polarizing plate in a case where the relationship between the maximum width $D_R$ of the reflective layer 30 and the minimum width $D_C$ of the reflective layer 30 was changed was measured. The optical characteristics were obtained in the same manner as in Example 1. The maximum width $D_R$ of the reflective layer 30 was fixed to 30 nm, and the minimum width $D_C$ of the reflective layer 30 was changed to 1 nm, 10 nm, 15 nm, 25 nm, and 30 nm. The height $H_C$ of the second curved surface 30a was fixed to 50 nm. The parameters other than the fact that the reflective layer 30 includes the second curved surface 30a and the minimum width $D_C$ thereof were the same as in Example 1. In addition, in a case where the minimum width $D_C$ is 30 nm, Example 3 corresponds to Example 1 in which the reflective layer 30 does not have the second curved surface 30a.

Figure 8:
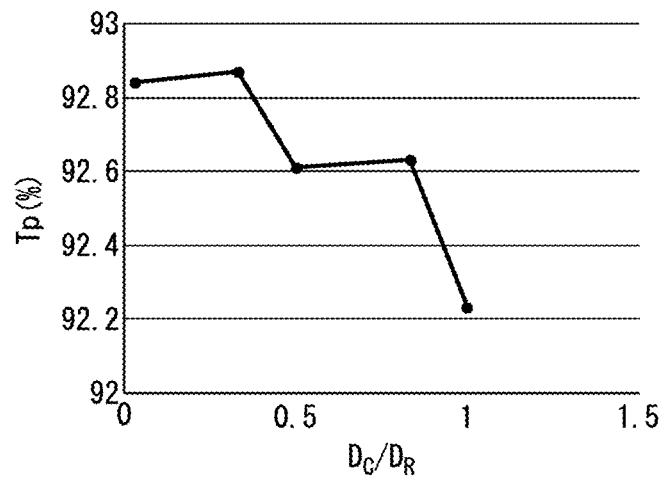
FIG. 8 shows a result obtained by measuring the optical characteristics of a polarizing plate of Example 3.

FIG. 8 shows a result obtained by measuring the optical characteristics of the polarizing plate of Example 3. FIG. 8 shows the transmission axis transmittance. In the measurement, the transmittance or the absorptance for light having a wavelength in the G region at a wavelength of 500 nm to 600 nm was obtained. As shown in FIG. 8, since the reflective layer 30 included the second curved surface 30a recessed toward the central axis C, the transmission axis transmittance was improved.

Example 4

In Example 4, a polarizing plate having the same configuration as the polarizing plate 100 shown in FIG. 1 was prepared. Example 4 is different from Example 3 in that the relationship of the height $H_C$ of the second curved surface 30a with respect to the height $H_R$ of the reflective layer 30 was changed. The minimum width $D_C$ of the reflective layer 30 was 15 nm.

In Example 4, a change in the optical characteristics of the polarizing plate in a case where the relationship between the height $H_R$ of the reflective layer 30 and the height $H_C$ of the second curved surface 30a was changed was measured. The optical characteristics were obtained in the same manner as in Example 1. The height of the reflective layer 30 was fixed to 250 nm, and the height of the second curved surface 30a was changed to 0 nm, 25 nm, 50 nm, 75 nm, 100 nm, 125 nm, 150 nm, and 250 nm. The fact that the height of the second curved surface 30a is 0 nm corresponds to Example 1 not having the second curved surface 30a.

Figure 9:
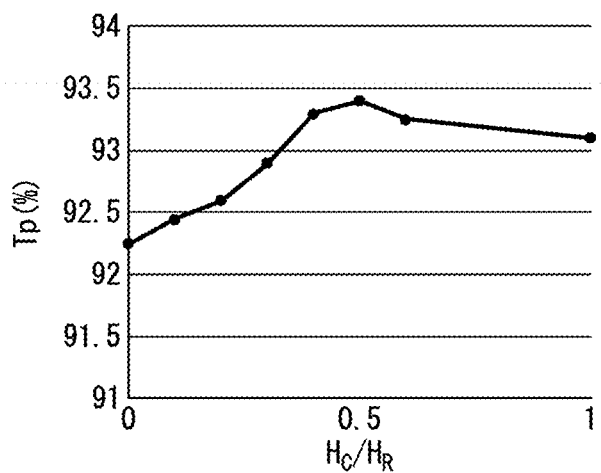
FIG. 9 shows a result obtained by measuring the optical characteristics of a polarizing plate of Example 4.

FIG. 9 shows the result obtained by measuring the optical characteristics of the polarizing plate of Example 4. FIG. 9 shows the result of the transmission axis transmittance. In the measurement, the transmittance or the absorptance for light having a wavelength in the G region at a wavelength of 500 nm to 600 nm was obtained. As shown in FIG. 9, in either case, high transmission axis transmittance was shown.

Particularly, in a case where the height $H_R$ of the reflective layer and the height $H_C$ of the second curved surface 30a satisfied a relationship of $0.3 \leq H_C/H_R \leq 1$, the transmittance was significantly improved.

Example 5

Figure 10:
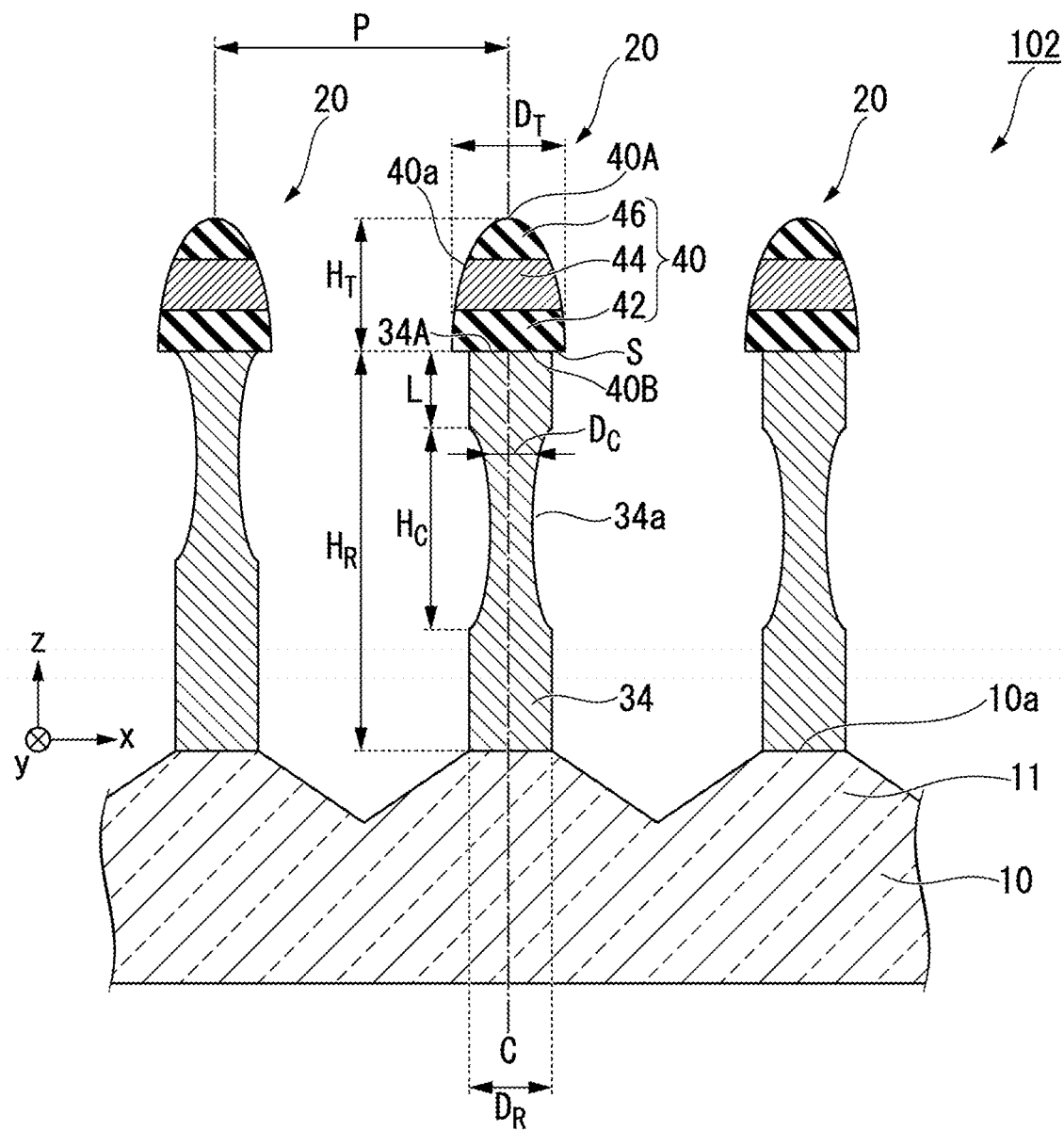
FIG. 10 is a schematic cross-sectional view of another example of the polarizing plate according to the first embodiment.

In Example 5, a polarizing plate having the same configuration as a polarizing plate 102 shown in FIG. 10 was prepared. The polarizing plate 102 shown in FIG. 10 is different from the polarizing plate 100 as shown in FIG. 1 in that the shape of a reflective layer 34 is different. The polarizing plate 102 shown in FIG. 10 is different from the polarizing plate 100 as shown in FIG. 1 in that a first end portion 34A of the reflective layer 34 is not in contact with the end portion of a second curved surface 30a. Example 5 is different from Example 3 in that a distance L between the first end portion 34A of the reflective layer 34 and the end portion of the second curved surface 34a was changed. The minimum width $D_C$ of the reflective layer 34 was 15 nm and the height $H_C$ of the second curved surface 34a was 50 nm.

In Example 5, in a case where the relationship between the height $H_R$ of the reflective layer 34 and the distance L between the first end portion 34A of the reflective layer 34 and the end portion (upper end portion) of the second curved surface 34a was changed, a change in the optical characteristics of the polarizing plate was measured. The optical characteristics were obtained in the same manner as in Example 1. The height $H_R$ of the reflective layer 34 was fixed to 250 nm and the distance L between the first end portion 34A and the end portion of the second curved surface 34a was changed to 0 nm, 50 nm, 100 nm, and 150 nm.

Figure 11:
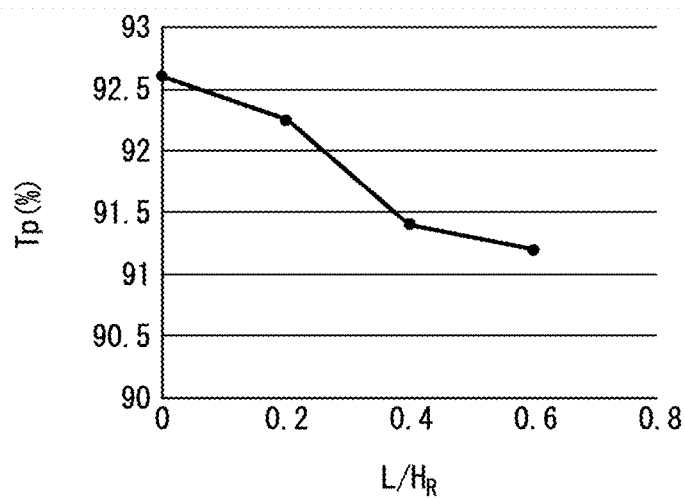
FIG. 11 shows a result obtained by measuring the optical characteristics of a polarizing plate of Example 5.

FIG. 11 shows the result obtained by measuring the optical characteristics of the polarizing plate of Example 5. FIG. 11 shows the result of the transmission axis transmittance. In the measurement, the transmittance or the absorptance for light having a wavelength in the G region at a wavelength of 500 nm to 600 nm was obtained. As shown in FIG. 11, as the distance L between the first end portion 34A and the end portion of the second curved surface 34a becomes closer, the transmission axis transmittance was improved. When part of the second curved surface 34a was in contact with the first end portion 34A of the reflective layer 34, the transmission axis transmittance was significantly improved.

Example 6 and Comparative Example 1

In Example 6, a polarizing plate having the same configuration as the polarizing plate 100 shown in FIG. 1 was prepared. The specific configuration was as follows.
Substrate 10: alkali-free glass (Eagle XG, manufactured by Corning Incorporated)
Height of base 11: 60 nm
Pitch P of adjacent projections 20: 140 nm
Reflective layer 30: aluminum
Maximum width $D_R$ of reflective layer 30: 30 nm
Minimum width $D_C$ of reflective layer 30: 25 nm
Height $H_R$ of reflective layer 30: 250 nm
Height $H_C$ of second curved surface 30a: 125 nm
Shape of second curved surface 30a: shape projecting downwardly toward central axis (the shape can be approximated by the relational expression (2))
Shortest distance between adjacent reflective layers 30: 110 nm
Minimum width $D_T$ of tip end portion 40: 30 nm
Height $H_T$ of tip end portion 40: 60 nm
Configuration of tip end portion 40:
Dielectric layer 42: $SiO_2$, thickness 5 nm
Absorption layer 44: Fe (5 atm %) and Si (95 atm %), thickness 25 nm
Second dielectric layer 46: $SiO_2$, thickness 30 nm
Cross-sectional shape of tip end portion 40 (cross section perpendicular to first direction in which the projection 20 extends): first curved surface projecting upwardly (projecting in +z direction) (the shape of the first curved surface can be approximated by the relational expression (1))
Comparative Example 3 is different from Example 6 in that the cross-sectional shape of the tip end portion 40 is rectangular. Other conditions were the same as in Example 6.

Figure 12A:
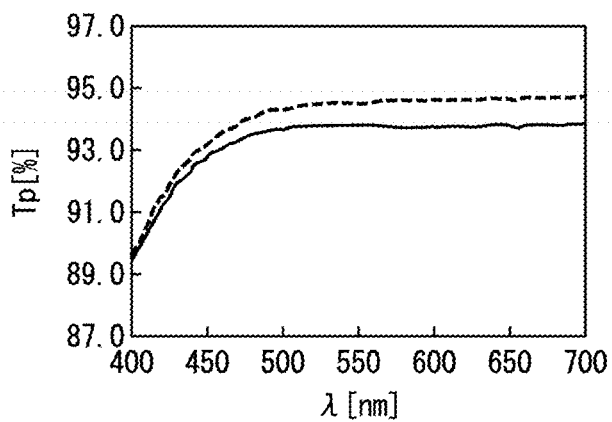
FIG. 12A shows results obtained by measuring the transmission axis transmittance which is one of optical characteristics of each of Example 6 and Comparative Example 3.
Figure 12B:
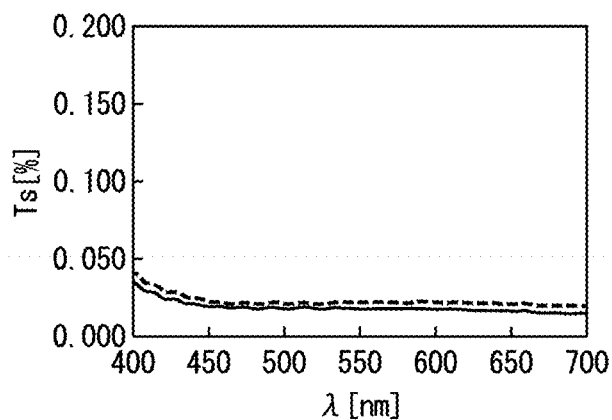
FIG. 12B shows results obtained by measuring the absorption axis transmittance which is one of optical characteristics of each of Example 6 and Comparative Example 3.
Figure 12C:
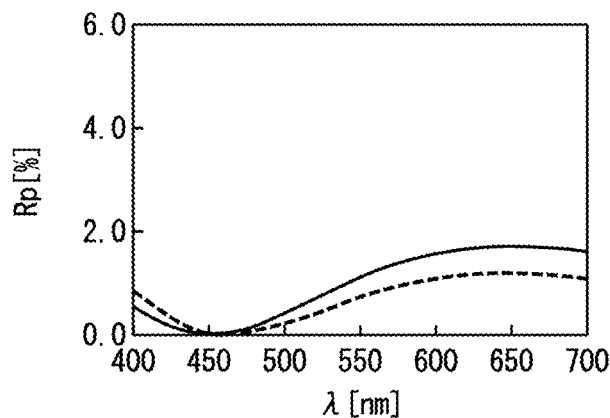
FIG. 12C shows results obtained by measuring the transmission axis reflectance which is one of optical characteristics of each of Example 6 and Comparative Example 3.
Figure 12D:
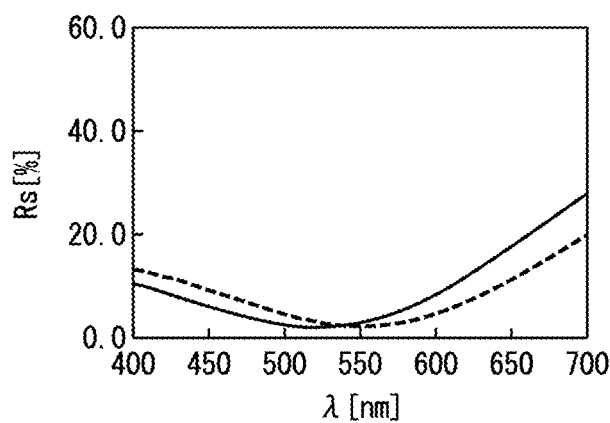
FIG. 12D shows results obtained by measuring the reflection axis reflectance which is one of optical characteristics of each of Example 6 and Comparative Example 3.

The optical characteristics for each wavelength of Example 6 and Comparative Example 3 were measured. FIGS. 12A to 12D show the results obtained by measuring the optical characteristics of Example 6 and Comparative Example 3. FIG. 12A shows the result of the transmission axis transmittance, FIG. 12B shows the result of the absorption axis transmittance, FIG. 12C shows the result of the transmission axis reflectance, and FIG. 12D shows the result of the reflection axis reflectance. The dotted line indicates the result of Example 6, and the solid line indicates the result of Comparative Example 3. It was confirmed that the optical characteristics of the polarizing plate can be improved since the cross-sectional shape of the tip end portion 40 is the first curved surface. In Table 1, the results at a wavelength of 520 to 590 nm in FIGS. 12A to 12D were shown.

TABLE 1

|  | Tp (%) | Ts (%) | Rp (%) | Rs (%) |
| --- | --- | --- | --- | --- |
| Comparative Example 3 | 93.7 | 0.018 | 1.16 | 1.53 |
| Example 6 | 94.5 | 0.022 | 0.78 | 0.49 |

REFERENCE SIGNS LIST

10: substrate
10a: first surface
11: base
20: projection
30, 32, 34: reflective layer
30a, 34a: second curved surface
30A, 34A: first end portion
40: tip end portion
40A: first end portion
40B: second end portion
40a: first surface
42: dielectric layer
44: absorption layer
46: second dielectric layer
100, 101, 102: polarizing plate

The invention claimed is:
1. A polarizing plate having a wire grid structure, the polarizing plate comprising:
a transparent substrate; and
a plurality of projections which extend in a first direction on the transparent substrate and are periodically arrayed at a pitch that is shorter than a wavelength of light in a used band,
wherein each of the projections includes a reflective layer, and a tip portion,
the tip portion is arranged at a position further away from the substrate than the reflective layer,
the tip portion is continuously widened from a first end point, which is a tip end point of the tip portion, to a second end surface on a side close to the substrate in a first cut plane perpendicular to the substrate and the first direction,
a first surface of the tip portion is made of a continuous first curved surface, the first surface being a curved surface protruding in the first direction and connected on an outer periphery of the second end surface,
a step is provided at a connection portion between the tip portion and the reflective layer, and
in a case where a center of the second end surface is used as an origin, the first curved surface of the tip portion is approximated by the following relational expression $z=(-D_T^2/4H_T)x^2+H_T$ wherein $D_T$ represents a maximum width of the tip portion and $H_T$ represents a height of the tip portion.
2. The polarizing plate according to claim 1,
wherein in the first cut plane, when the maximum width of the reflective layer is $D_R$, and the maximum width of the tip portion is $D_T$, a relationship of $1 \leq D_T/D_R \leq 2.3$ is satisfied.
3. The polarizing plate according to claim 1,
wherein the tip portion has a dielectric layer, an absorption layer, and a second dielectric layer in order from a side close to the substrate.
4. An optical apparatus, comprising:
the polarizing plate according to claim 1.
5. The polarizing plate according to claim 1,
wherein in the first cut plane, the reflective layer includes a second curved surface recessed toward a central axis of the reflective layer.
6. The polarizing plate according to claim 5,
wherein part of the second curved surface is in contact with a first end point of the reflective layer on a side close to the tip portion.

7. The polarizing plate according to claim 5,
wherein in the first cut plane, when the height of the reflective layer is $H_R$, and the height of the second curved surface is $H_C$, a relationship of $0.3 \leq H_C/H_R \leq 1$ is satisfied.

8. The polarizing plate according to claim 5,
wherein in a case where a middle point of a position where a width of the reflective layer is minimum is used as an origin, the second curved surface of the reflective layer is approximated by the following relational expression, $$z^2 = ((-H_C^2 + 2D_C)/4D_R^2)x^2 + (D_C/2)$$

in the relational expression, He represents the height of the second curved surface, $D_C$ represents the minimum width of the reflective layer, and $D_R$ represents the maximum width of the reflective layer.

* * * * *

UNITED STATES PATENT AND TRADEMARK OFFICE
CERTIFICATE OF CORRECTION

PATENT NO. : 11,500,140 B2
APPLICATION NO. : 16/755441
DATED : November 15, 2022
INVENTOR(S) : Shibuya et al.

It is certified that error appears in the above-identified patent and that said Letters Patent is hereby corrected as shown below:

In the Claims

In Column 16, Line 48, in Claim 1, delete "portion." and insert --portion, wherein the first curved surface has a continuous curvature from one side of a central axis of the reflective layer to an opposite side of the central axis of the reflective layer.-- therefor In Column 16, Line 62, in Claim 5, delete "a" and insert --the-- therefor In Column 17, Line 14, in Claim 8, delete "He" and insert --$H_c$-- therefor Signed and Sealed this
Seventh Day of November, 2023

Katherine Kelly Vidal
*Director of the United States Patent and Trademark Office*